Nov. 14, 1967  E. A. PREUSS  3,353,181

SELF-TEST CIRCUIT FOR TRANSPONDER

Filed Dec. 7, 1965  2 Sheets-Sheet 1

INVENTOR
ERNEST A. PREUSS
BY Browne, Schuyler & Beveridge
ATTORNEYS

INVENTOR
ERNEST A. PREUSS

BY Browne, Schuyler & Beveridge
ATTORNEYS

United States Patent Office 3,353,181
Patented Nov. 14, 1967

3,353,181
SELF-TEST CIRCUIT FOR TRANSPONDER
Ernest A. Preuss, Convent Station, N.J., assignor to Aircraft Radio Corporation, Boonton, N.J., a corporation of New Jersey
Filed Dec. 7, 1965, Ser. No. 512,136
4 Claims. (Cl. 343—17.7)

This invention relates to self-testing circuits for navigational transponders.

Due to the greatly increased air traffic, it has become necessary to provide devices which will automatically identify aircraft to ground control stations. Such devices, working in conjunction with or in addition to known radar techniques, provide not only more accurate ground control of air traffic but also serve as navigational aids.

One class of such control devices is the airborne transponder. Transponders receive interrogation signals from ground stations in the form of pulse trains. After decoding the interrogation pulses to determine the information requested, the transponder automatically transmits the proper reply from which aircraft position or altitude may be obtained.

At the present time, the Air Traffic Control Radar Beacon System (ATCRBS) is being installed in the United States. The system, using airborne transponders, enable ATC ground controllers to identify aircraft in flight at distances beyond primary radar range.

Each ATCRBS station transmits interrogation pulses at 1030 megacycles from a rotating antenna. The leading edges of the pulses are spaced either 8 or 21 microseconds apart and each pulse is .8 microsecond wide.

When an airborne ATCRBS transponder receives pulse trains of the proper pulse width and spaced 8 microseconds apart, coding circuits in the transponder cause the transponder's transmitter to reply with pulse codes from which the aircraft's position may be obtained. If the pulses, received on the same frequency, are 21 microseconds apart, the transmitter replies with codes stating the aircraft's altitude.

Since the proper operation of each airborne transponder is of vital importance to accurate air traffic control, it is necessary that means be provided to monitor transponder operation. Such is the purpose of this invention.

It is accordingly the object of this invention to provide a circuit capable of testing transponder operation.

One direct way of checking the circuit operation in a transponder would be to generate pulse trains at the interrogation frequency, 1030 megacycles, on the aircraft and inject them into the antenna circuit. Such high frequencies are difficult to generate accurately and moreover the equipment necessary is cumbersome and expensive. According to this invention, the self-test circuit tests most of the active circuitry in an airborne transponder by momentarily generating a pair of pulses of suitable width and spaced either 8 or 21 microseconds apart. The pulses are applied to the anode of the local oscillator of the transponder receiver and act to cause two fast changes in the mixer current. Enough high frequency energy is contained in the leading edges of the resultant current pulses to be amplified by the transponder IF amplifier and normally detected. The detected pulses act just like a normal interrogation, and the transponder decoding circuits cause the transmitter to reply accordingly.

Transponder replies are monitored by a small lamp visible to the aircraft pilot. The lamp is triggered by a line loosely coupled to the anode lead of the transponder transmitter cavity. It should be noted that the monitor light is useful for observing replies to actual ground station interrogations as well as replies to self-test signals.

Objects of this invention may be understood by reference to the following detailed description and to the accompanying drawings, wherein.

Figure 1:
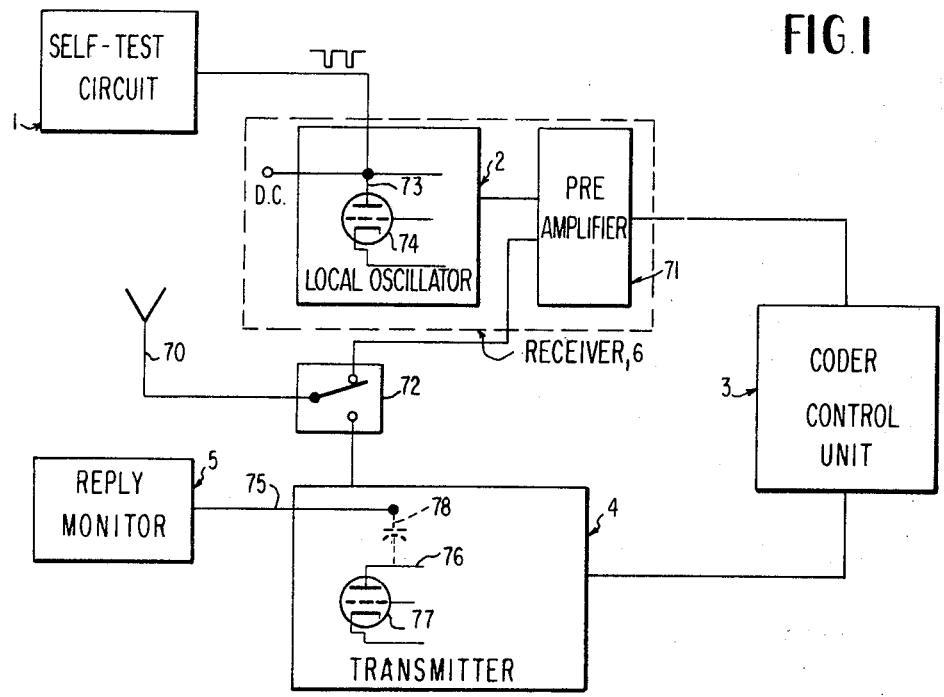
FIGURE 1 is a block diagram of the self-test circuit in combination with a transponder.

Referring to FIGURE 1, transponder antenna 70 is connected to the input of pre-amplifier 71 via selector switch 72. When the transponder is not transmitting, the selector switch is in the position shown, connecting antenna 70 to the input of transponder receiver 6. After the proper interrogation signals have been received and decoded, to reply the selector switch 72 connects antenna 70 to the output of transmitter 4.

Interrogation signals received on antenna 70 are uniform pulse trains at a frequency of 1030 megacycles. Transponder local oscillator 2 generates a beating signal at a frequency of 1090 megacycles. The antenna input and the beating signal from the local oscillator are applied to a mixing stage in preamplifier 71. The resultant I.F. frequency, 60 megacycles, is applied to the coder unit 3 where the received pulses are checked for proper width and spacing. Depending upon the information requested by the pulses, which is determined by their spacing, coder 3 causes transmitter 4 to reply to the ATCRBS ground station. Reply monitor 5 provides an indication to the aircraft's pilot that a reply to an interrogation has been made.

In order to check transponder operation, self-test circuit 1 generates pulse pairs of either 8 or 21 microsecond separation and of 1 microsecond width. Test pulses are applied to anode 73 of triode 74 in the transponder local oscillator 2. Test pulses are of a magnitude sufficient to substantially ground the anode and cause interruption of local oscillator current. Since the test pulses are properly spaced and are of the proper duration, coder 3 causes transmitter 4 to reply in the usual manner. Reply monitor 5 then indicates to the aircraft pilot that the tested circuitry is operating satisfactorily.

In the preferred embodiment of this invention, reply monitor 5 is a neon bulb energized over line 75. Line 75 is loosely connected to the anode 76 of transmitter power tube 77 by circuit distributed capacitance 78.

Figure 2:
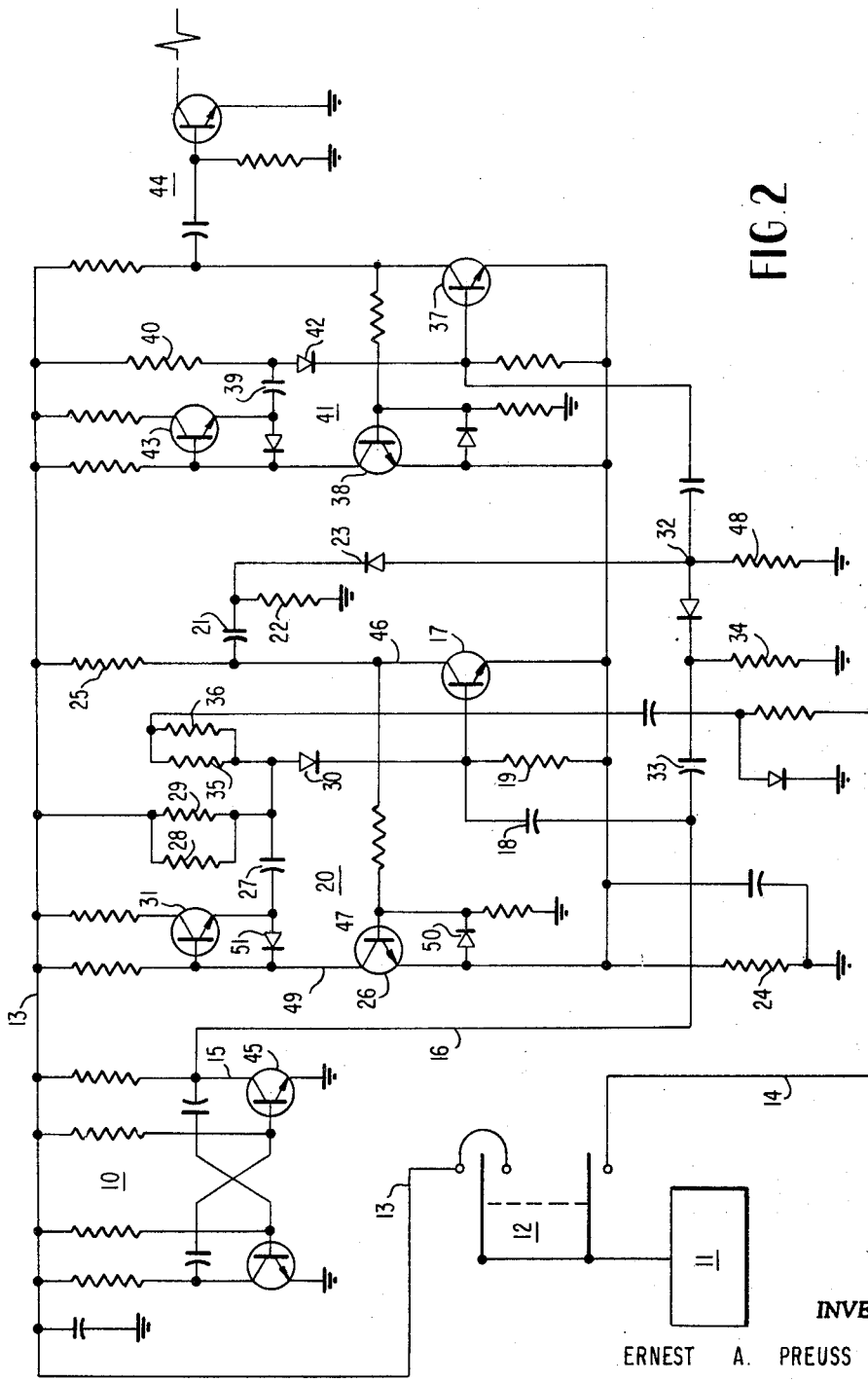
FIGURE 2 is a schematic diagram of the self-test circuit.

FIGURE 2 is a schematic diagram of the self-test circuit. DC power is supplied to the circuit from voltage source 11. For Mode A operation (short delay), pilot operated Mode switch 12 connects DC power from voltage source 11 into the self-test circuit over lines 13, 14. In Mode C Operation (long delay), line 14 is disconnected from source 11.

Figure 3:
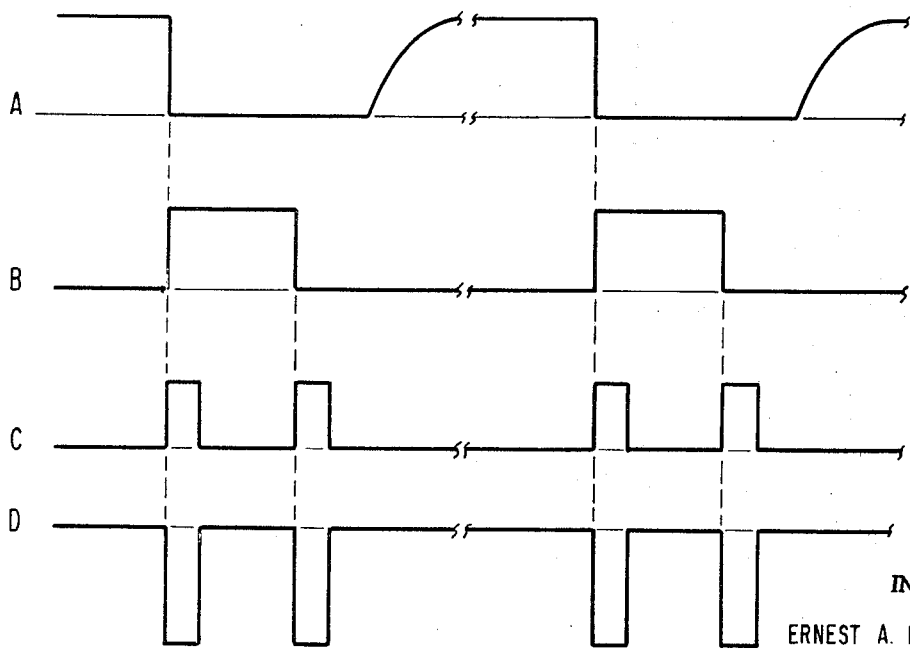
FIGURE 3 illustrates wave forms useful in explaining the operation of the self-test circuit.

Rate Generator 10, comprised of a free-running multivibrator of conventional design, generates a repetitive base timing signal at collector 15 of output transistor 45. Wave form A of FIGURE 3 illustrates the base timing signal output of transistor 45. Since the output transistor alternatively switches on and off, the voltage level on collector 15 alternates from approximately the level of DC source 11 to ground. The output frequency of Rate Generator 10 is determined by the frequencies involved in the particular transponder. In the case of the transponder utilized in the ATCRBS, the output frequency is 600 cycles.

Transistor 17 of Delay Multivibrator 20 is biased in the normally conductive state. When the first negative going signal appears at the output of Rate Generator 10, differentiating circuit 18, 19 applies a negative voltage spike to the base of transistor 17, causing it to switch off. Wave form B of FIGURE 3 illustrates the voltage levels which appear at collector 46 of transistor 17. Since collector resistor 25 is considerably larger than common emitter resistor 24, the collector voltage of transistor 17 alternates from nearly ground potential to that of DC source 11. The positive voltage spike generated by differentiating circuit 21, 22 from the sudden rise of transistor 17 collector voltage is blocked from entering the remainder of the circuit by diode 23.

Since collector electrode 46 is nearly at ground level when transistor 17 is conducting, transistor 26 is normally switched off. However, when transistor 17 switches off, the voltage on base electrode 47 of transistor 26 suddenly rises, switching that transistor on.

In Mode C operation, test pulses must be generated every 21 microseconds. In this Mode, line 14 is not connected to voltage source 11 and Mode A timing resistors 35, 36 are not in the circuit. However, as soon as transistor 26 switches on, timing capacitor 27 begins to charge through Mode C timing resistors 28, 29. The positive charge collecting on timing capacitor 27 is applied to the base electrode of transistor 17 through diode 30. When the stored charge reaches the proper magnitude, transistor 17 switches on. The resultant negative drop in voltage level on collector electrode 46 causes transistor 26 to switch off, thereby stopping the charging of timing capacitor 27.

For Mode A operation, Mode switch 12 connects Mode A timing resistors to voltage source 11 via line 14. Timing capacitor 27 will then charge through both sets of timing resistors 28, 29 and 35, 36, reaching its full charge in 8 microseconds.

As transistor 17 switches on, differentiating circuit 21, 22 generates a negative voltage spike which is applied across input resistor 48 via diode 23.

As soon as transistor 26 switches off, the voltage level on collector 49 rises. Transistor 31 switches on and discharges timing capacitor 27.

Transistors 26 and 31 are connected from their emitter electrodes to their base electrodes by diodes 50 and 51, respectively. Diode 51 serves to speed up the recovery time of the Delay Multivibrator. Diode 50 serves principally to stabilize the operation of transistor 26 at differing temperatures.

At the same time the first negative going signal was applied to the base of transistor 17 through differentiating circuit 18, 19, the same signal was applied across input resistor 48 through differentiating circuit 33, 34. Accordingly, resistor 48 received a negative spike voltage generated at the time of the leading edge of the first negative going signal generated by Rate Generator 10 and at the same time that transistor 17 switched off. Input resistor 48 receives a second negative spike voltage when transistor 17 is switched on by the timing components of Delay Multivibrator 20.

When the first negative spike voltage is applied to the base electrode of transistor 37 from input resistor 48, the transistor, normally conducting, switches off. The resultant rise in the voltage level applied to the base electrode of transistor 38 causes that transistor to switch on. Timing capacitor 39 immediately begins to charge through timing resistor 40. As in the timing circuitry of Delay Multivibrator 20, the timing circuitry of Output Width Multivibrator 41 serves to hold transistor 37 off for an exact period of time. The timing circuitry in the Output Width Multivibrator is chosen so that transistor 37 is turned off for exactly 1 microsecond. Thereafter, the positive charge on timing capacitor 39, which is applied to the base of transistor 37 via diode 42, causes that transistor to switch on. As a result, a voltage pulse of 1 microsecond duration is generated by Output Width Multivibrator 41 upon receipt of the first negative spike voltage generated from the leading edge of the first negative going signal from Rate Generator 10.

After transistor 37 switches on, causing transistor 38 to turn off, transistor 43 is turned on and discharges timing capacitor 39 through its collector-emitter path.

Voltage pulses appearing on the collector of transistor 37 are applied to the base electrode of output pulse amplifier 44. The gain of amplifier 44 is set so that its pulse output will approximately equal the DC voltage level applied to the anode of the transponder local oscillator 2 but be of opposite polarity. Amplified pulses from Output Pulse Amplifier 44 are applied to anode 73 of local oscillator 2 of the transponder (FIGURE 1). Since the pulses generated by the self-test circuit are negative and approximately equal in amplitude to the DC level applied to the local oscillator, the pulses effectively short out the local oscillator 2.

Second pulses in each pulse pair originate with the negative voltage spike generated by differentiating circuit 21, 22. When a negative spike voltage resulting from the switching on of transistor 17 is applied to the base electrode of transistor 37 via input resistor 48, a second 1 microsecond pulse is generated in a manner identical to the first. In this way, the circuit delivers a pair of pulses each having a .8 microsecond duration and spaced either 8 or 21 microseconds apart, depending upon whether Mode A or Mode C was chosen.

Wave form C of FIGURE 3 illustrates the voltage level which appears on the collector of transistor 37 of Output Width Multivibrator 41. Pulses generated by transistor 37 are inverted and amplified by the output pulse amplifier 44 and applied to the anode of the local oscillator 2. Waveform D of FIGURE 3 illustrates the inverted pulse voltages generated on the collector of pulse amplifier 44. When the pilot wishes to test the operation of the airborne transponder, he first switches Mode switch 12 to one position and then the other. After each switching, reply monitor 5 will light if the transponder circuitry operated properly and generated a reply. If the pilot observes a reply monitor indication after operating the self-test circuit both in Mode A and Mode C, he may assume that the transponder is operating properly.

As may be readily appreciated by those skilled in the art, changes may be made in the circuit design of the self-test circuit without departing from the spirit of this invention. It is intended that this invention be limited only by the appended claims.

What is claimed is:

1. In a transponder having local oscillator means for generating a beating signal, said oscillator means including an active element means having an anode,
   a self-test circuit comprising means for generating a base timing signal of fixed duration, first means responsive to the leading edge of said base timing signal for generating a first pulse timing signal,
   second means responsive to the leading edge of said base timing signal for generating a second pulse timing signal at a variable interval after the first,
   means for generating a test pulse of fixed duration in response to each of said pulse timing signals, the fixed duration being less in time than the variable delay between said pulse timing signals,
   and means for applying said test pulses to the anode of said local oscillator means,
   whereby circuits of said transponder are tested for proper operation.

2. The combination of claim 1, wherein said second means comprises
   timing means for initiating an interval signal in response to the leading edge of said base timing signal, said interval signal determining the interval between said first and second pulse timing signals, and
   differentiating means for generating said second pulse timing signal in response to the end of said interval signal.

3. The self-test circuit for a transponder according to claim 1, wherein said first means comprises a first differentiating means, said second means comprises a timing means for generating an interval signal determining the time interval between said first and second pulse timing signals, said timing means initiating said interval signal in response to the leading edge of said base timing signal, and a second differentiating means for generating said second pulse timing signal in response to the end of said interval signal.

4. The self-test circuit for a transponder according to claim 1, wherein said second means comprises first differentiating means responsive to the leading edge of said base timing signal for initiating an interval signal, timing means responsive to said first differentiating means for generating said interval signal, and second differentiating means responsive to the end of said interval signal for generating said second pulse timing signal.

References Cited

UNITED STATES PATENTS

| | | | |
|---|---|---|---|
| 2,855,509 | 10/1958 | Moore. | |
| 2,860,334 | 11/1958 | Cowdery et al. | 343—17.7 |
| 2,939,135 | 5/1960 | Beckerich et al. | 343—17.7 X |
| 3,253,278 | 5/1966 | Lucchi | 343—7.3 |

RODNEY D. BENNETT, *Primary Examiner.*

T. H. TUBBESING, *Assistant Examiner.*